United States Patent [19]

Eadie et al.

[11] 4,176,926

[45] Dec. 4, 1979

[54] OPTICAL PROJECTION APPARATUS

[75] Inventors: David W. Eadie, Corfe Mullen; Charles J. Hancock, Bournemouth, both of England

[73] Assignee: Quest Automation Limited, Dorset, England

[21] Appl. No.: 836,827

[22] Filed: Sep. 26, 1977

[30] Foreign Application Priority Data

Sep. 28, 1976 [GB] United Kingdom ............... 40196/76
Jun. 3, 1977 [GB] United Kingdom ............... 23646/77

[51] Int. Cl.$^2$ ............................................. G03B 29/00
[52] U.S. Cl. ............................................. 354/4
[58] Field of Search ............................... 354/4; 355/71

[56] References Cited

U.S. PATENT DOCUMENTS

| | | | |
|---|---|---|---|
| 2,346,983 | 4/1944 | Mayer et al. | 355/71 X |
| 3,185,053 | 5/1965 | Wieszeck | 355/71 X |
| 3,260,152 | 7/1966 | Aston | 355/71 X |
| 3,323,414 | 6/1967 | Ritchie et al. | 354/4 |
| 3,610,119 | 10/1971 | Gerber et al. | 354/4 |
| 3,673,937 | 7/1972 | Mader | 354/4 |
| 3,695,154 | 10/1972 | Webster | 354/4 |
| 3,747,486 | 7/1973 | Herrmann | 354/4 |

FOREIGN PATENT DOCUMENTS

| | | | |
|---|---|---|---|
| 1156061 | 6/1969 | United Kingdom | 354/4 |
| 1156062 | 6/1969 | United Kingdom | 354/4 |
| 1175493 | 12/1969 | United Kingdom | 354/4 |

Primary Examiner—Donald A. Griffin
Attorney, Agent, or Firm—Pollock, Vande Sande & Priddy

[57] ABSTRACT

Projection apparatus for photodrafting equipment in which an exposure control disc is rotated to vary the intensity of the projected light during exposure of a line is provided with a region which on rotation of the disc effects progressive decrease in the intensity, that region being followed by an aperture or clear region and that in turn being followed by an opaque region. Thus the disc can be rotated in one direction to progressively reduce the intensity, then produce a brief flash at maximum intensity, and then shut off the projected light completely. The preferred form of the exposure control disc, believed novel in itself, comprises a tapered slot movable lengthwise through the optical path of the apparatus to selectively restrict the exit pupil thereof.

5 Claims, 4 Drawing Figures

OPTICAL PROJECTION APPARATUS

BACKGROUND OF THE INVENTION

This invention relates generally to photodrafting equipment, that is to say, equipment arranged to project a beam of light to illuminate a spot on a photosensitive surface and to move the spot of light relatively to the surface to expose a line thereon. More particularly, the invention relates to projection apparatus for photodrafting equipment.

Photodrafting equipment is commonly used to expose photographic sheets used in turn to produce masks for the production of printed circuit boards and the like. Projection apparatus mounted on a carriage movable in X- and Y- co-ordinate directions under the control of a computer or other control means is arranged to project a beam of light substantially orthogonally against a photographic sheet disposed in a plane parallel with the X- and Y-coordinate directions. By this means, a line can be exposed on the sheet by movement of the carriage during continuous projection of the beam, or discrete "pads" can be exposed in selected positions on the sheet by moving the carriage to the corresponding coordinate positions successively, the light beam being projected only when the carriage is located at one of those positions.

It is to be noted that, when exposing a line the exposure of any given section of the line depends upon the speed with which the spot of light formed by the beam is moved along that section of the line. To compensate for variations in exposure during acceleration and deceleration of the carriage at the start and finish of a line, the intensity of the beam can be varied in accordance with the speed of movement of the carriage.

Conveniently, the beam of light projected when exposing lines is circular in cross-section with a substantially uniform distribution of intensity across the area of the section. This, however, presents the problem that the amount of light received at the extreme ends of the line is small compared with the amount received by other parts of the line, so that the ends of the line are liable to be underexposed causing fuzziness and indistinctness.

SUMMARY OF THE INVENTION

It is an object of one aspect of the present invention to provide projection apparatus for photodrafting equipment arranged so that, when the equipment is operated to expose a line, the apparatus can produce a brief flash of light at maximum intensity at the start and end of the line.

From one aspect, the present invention provides projection apparatus for photodrafting equipment, the apparatus comprising intensity varying means moveable in use of the apparatus to vary the intensity of the light beam projected by the apparatus, said intensity varying means being arranged for movement through successive positions providing progressively reducing intensity of said light beam followed by relatively high intensity of said light beam that in turn being followed by substantially zero intensity of said light beam.

It is an object of another aspect of the present invention to provide projection apparatus having inexpensive and convenient to use means for rapidly and controllably varying the intensity of the light projected thereby.

From another aspect, the present invention provides projection apparatus comprising intensity varying means including an aperture-stop mask formed with a slot which varies along its length, said mask being arranged for a segment of said slot to be interposed in the optical path of said apparatus to restrict the area of the exit pupil thereof and being moveable to permit lengthwise movement of said slot through said optical path to vary the area of said exit pupil whereby in use of the apparatus to vary the intensity of the light projected thereby.

DESCRIPTION OF THE DRAWINGS

In order that the invention may be clearly understood and readily carried into effect, an embodiment thereof will now be described by way of example only with reference to the accompanying drawings wherein.

DESCRIPTION OF THE PREFERRED EMBODIMENTS

Figure 1:
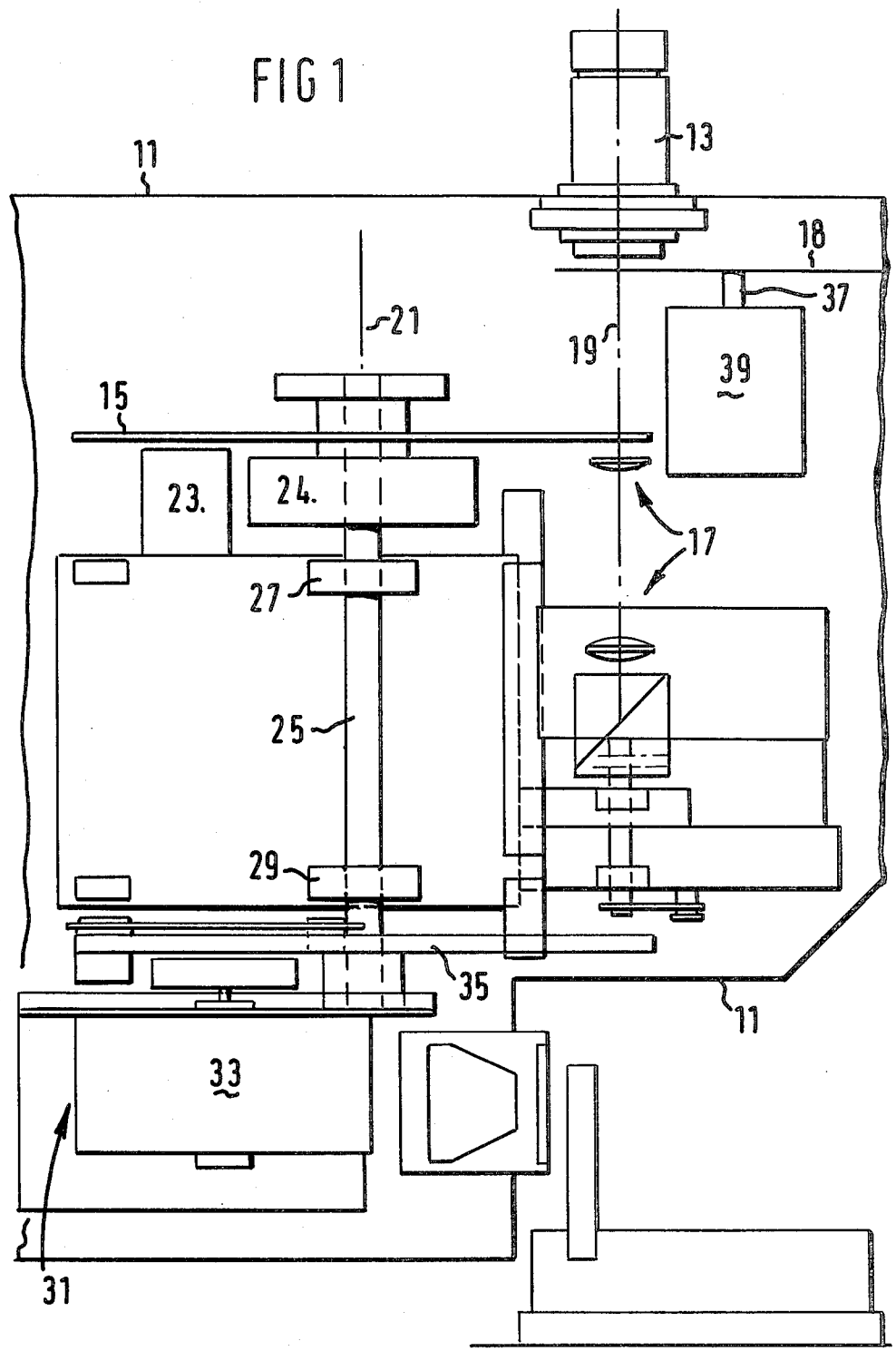
FIG. 1 is a front elevation of projection apparatus in accordance with the invention showing the general layout of the apparatus.

FIG. 1 shows in front elevation the housing of the carriage 11 in photodrafting equipment, the carriage 11 being moveable (by means not shown) in horizontal X- and Y- coordinate directions under the control of a computer. Projection apparatus mounted in the carriage is arranged to project a beam of light vertically upwardly from a projection lens 13, as described in more detail hereinafter, for impingement on a sheet of photosensitive material (not shown) disposed in a horizontal plane above the carriage.

The projection lens 13 is arranged to focus on the surface of the photosensitive material a real image of an image aperture formed near the periphery of an image disc 15. The image disc is illuminated from below by a light source (not shown in FIG. 1) and condenser system 17. An exposure control disc 18 is interposed in the optical path 19 between the image disc 15 and projection lens 13.

The image disc 15 is formed with a series of differently shaped or sized image apertures disposed around its periphery, the disc being rotatable about its axis 21 to enable any selected one of the apertures to be moved into position for illumination by the condenser system 17 and thus projection of its image onto the photosensitive surface. Optical sensing means 23 is mounted beneath the image disc 15 radially inwardly of the peripheral series of image apertures. Means 23 responds in use to coded markings provided on the underside of the disc whereby the angular position of the disc may be sensed to identify the image aperture currently positioned in the optical path 19 for projection of its image onto the photosensitive surface.

The image disc 15 is detachably mounted on a hub 24 fast with a drive shaft 25 journalled for rotation about the axis 21 in bearings 27 and 29. The drive shaft 25 is itself driven by means of an indexing mechanism 31 including a synchronous motor 33 arranged to drive an indexing disc 35 attached to the shaft 25. In operation, the indexing mechanism 31 responds to a drive pulse supplied to synchronous motor 33 to rotate the drive shaft 25 through an angle equal to the angular spacing between adjacent ones of the image apertures in image disc 15, the mechanism including a latching device arranged to ensure precision in the stepping angle of the indexing disc. Various forms of indexing mechanism suitable for this purpose will be well known to those skilled in the art.

Figure 2A:
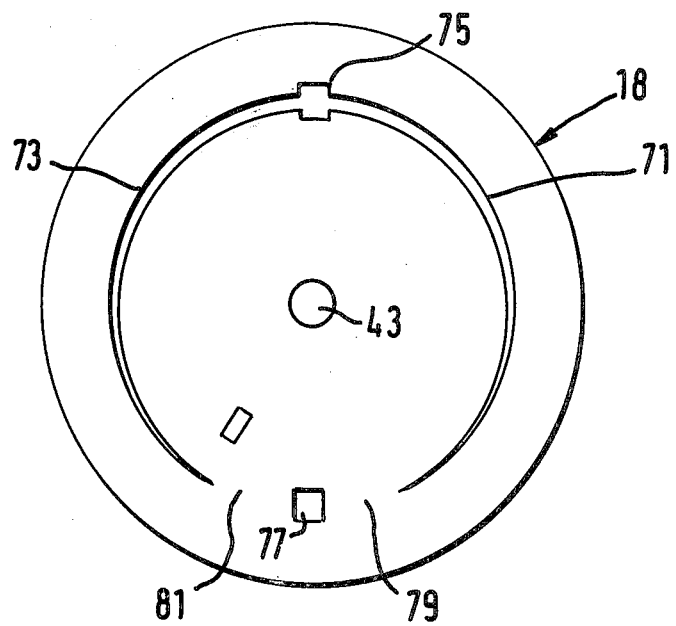
FIGS. 2A and 2B are plan views of exposure control discs for the apparatus of FIG. 1.

The exposure control disc 18 is mounted for rotation with the drive shaft 37 of a stepping motor 39. A plan view of one form of the exposure control disc is shown in FIG. 2A. The disc comprises a mask formed with first and second tapered slots 71 and 73 extending circumferentially away from a first aperture 75 towards a diametrically opposite second aperture 77. The width of each slot decreases progressively from a maximum adjacent the aperture 75 to zero at an angular displacement of some 30 degrees from the second aperture 77, opaque areas 79, 81 being interposed between the ends of the slots and the second aperture. The disc 18 is disposed in a plane adjacent the projection lens 13 so that the mask acts as an aperture stop for the optical system, and the axis of the disc is offset so that the optical path intercepts a region of the mask spaced from the axis by a distance corresponding to the radial spacing from the axis of the slots 71, 73 and apertures 75, 77. Thus on rotation of the disc, the slots are moved lengthwise through the optical path, and the disc can be rotated to position either one of the apertures 75, 77, either one of the opaque regions 79, 81 or any selected segment of either of the slots 71, 73 in the optical path to selectively restrict the exit pupil of the apparatus, and hence the intensity of the light projected thereby, accordingly.

In the particular embodiment illustrated, the light source used for tracing lines is an incandescent lamp with a substantially rectangular filament element and the apparatus is arranged so that a real image of the filament element is formed substantially in the plane of the exposure control disc 18. The sizes of the apertures 75, 77 are equal to or slightly greater than that of the image of the filament element, so that substantially the whole of the light from the filament can pass through the mask when it is positioned with either of the apertures 75 and 77 in the optical path.

The exposure control disc 18 is for use to vary the intensity of the projected light beam when the photodrafting equipment is being operated to expose a line. During movement of the carriage at normal speed, the light beam is required to be at maximum intensity, and the exposure control disc 18 is positioned so that the first aperture 75 in the mask is disposed in the optical path 19. As deceleration of the carriage is commenced towards the finish of the line, the computer or other means directing operation of the equipment causes drive pulses to be supplied to the stepping motor 39 to rotate the disc 18. Such rotation of the disc moves one of the slots 71, 73 (depending upon the direction of rotation) lengthwise through the optical path 19 thereby progressively decreasing the intensity of the projected light beam. In fact, the disc 18 is thus rotated under the direction of the computer or other means so that the intensity of the light beam is reduced in accordance with the reduction in speed of the carriage, thereby providing substantially constant exposure of the line as the carriage is brought to a halt. As the carriage is brought to a halt, the intensity of the light beam is reduced to zero by movement of the opaque region 79 or 81 (depending as above on the direction of rotation) into the optical path 19. Once the carriage has reached a halt, however, two further pulses are supplied to the stepping motor 39 in relatively rapid succession, thereby briefly moving the aperture 77 of the mask into the optical path 19 followed by the other opaque region 81 or 79. Rotation of the disc 18 then ceases until the equipment is operated to expose another line.

It will be appreciated that the two further pulses supplied to the stepping motor 39 after the carriage is brought to a halt provides a brief flash of the light beam at maximum intensity. The purpose of this is to insure adequate exposure of the extreme end portion of the line, thus avoiding the fuzziness or lack of definition which might otherwise occur for the reasons noted above.

When commencing the exposure of a fresh line, a similar procedure can be used. Thus, if it is assumed that the original position of the exposure control disc is such that the opaque region 79 is disposed in the optical path 19, before movement of the carriage the disc is rotated relatively rapidly two steps in the anti-clockwise direction (as seen in the drawing), thereby moving the second aperture 77 through the optical path 19 to produce a brief flash of the light beam at maximum intensity. The carriage is then accelerated in the direction of the line to be exposed, and the disc 18 continues to be rotated in the anticlockwise direction so that as the carriage approaches maximum speed, the first aperture 75 of the mask is moved into the optical path 19. Once again therefore, adequate exposure of the extreme end portion of the line is ensured, and the intensity of the light beam is progressively varied with the speed of the carriage to provide substantially constant exposure of the line during acceleration of the carriage.

Two oppositely directed slots 71, 73 are provided to enable a choice to be made as to whether or not to include the initial flash at the start of a line. Thus, in the example described above, the initial flash could be omitted merely by choosing to rotate the disc in the clockwise direction at the start of the acceleration of the carriage. This avoids the necessity for the provision of a separate shutter.

It will be appreciated that the exposure control disc comprising an aperture-stop mask as described above provides a convenient means for rapidly varying the intensity of the projected light. Moreover, since the mask configuration can be produced within close tolerances with relative ease, for example by photographic techniques, and the attenuation of the light beam for any given position of the disc depends substantially solely upon the width of that segment of the mask slot inserted in the optical path, the device is relatively inexpensive to produce and provides exceptionally precise control of the intensity of the light beam.

Figure 2B:
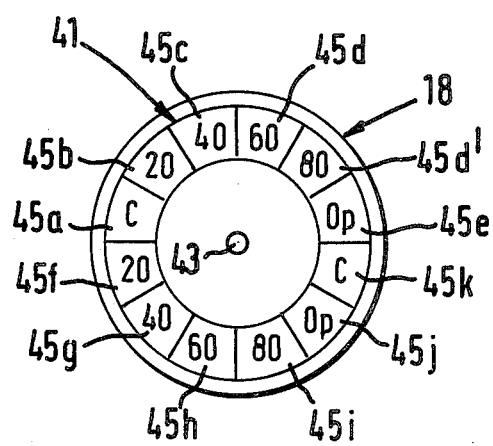

A plan view of an alternative form of exposure control disc is shown in FIG. 2B. The disc comprises an annular graded absorption filter 41 extending around the periphery of the disc, the absorption of the filter varying in the direction of angular displacement about the axis 43 of the disc. More specifically, the filter is divided into segmental regions 45 each having a respective substantially uniform absorption coefficient. The absorption coefficients range from substantially zero for the region indicated at 45a, increase progressively for the successive regions 45b, 45c, and 45d and the successive regions 45f, 45g and 45h extending respectively in angular directions away from the region 45a (the figures noted in the segments indicate the percentage absorption coefficients of the regions) and have a maximum at regions 45e and 45j, those regions being substantially opaque. Interposed between the opaque regions 45e and 45j is a second substantially clear region 45k.

The exposure control disc of FIG. 2B is used to vary the intensity of the projected light beam in the same way as is the disc of FIG. 2A. In the case of FIG. 2B, the two series of progressively more opaque regions 45b, 45c, etc. and 45d, and 45e, etc. enable the intensity of the light to be varied by varying the absorption of the light on rotation of the disc; whereas, in the case of FIG. 2A, the two slots 71, 73 enable the intensity of the light to be varied by restricting the exit pupil of the apparatus on rotation of the disc. It is to be noted, in particular, that the clear region 45k of the disc of FIG. 2B is provided for the same purpose as the aperture 77 of the disc of FIG. 2A; that is to say, so as to enable a brief flash of the light beam at maximum intensity to be provided as the carriage is brought to a halt when finishing exposure of a line.

Figure 3:
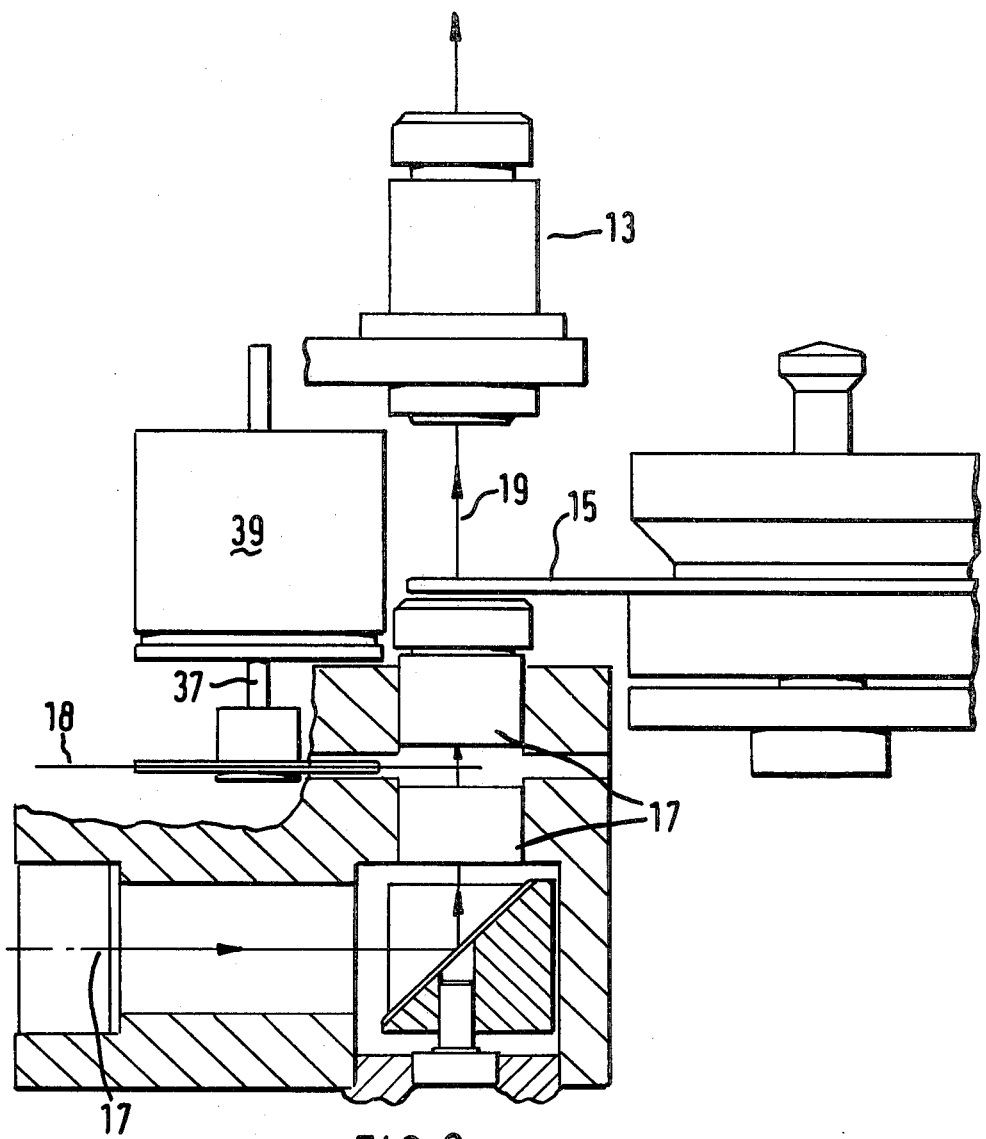
FIG. 3 is a front elevation of a modified form of projection apparatus in accordance with the invention showing the general layout of the apparatus.

FIG. 3 illustrates projection apparatus in accordance with the invention which is similar to that of FIG. 1, corresponding components of the two embodiments being indicated with the same reference numerals. In the apparatus of FIG. 3, the exposure control disc 18, which comprises a mask as described above with reference to FIG. 2A, is interposed in the optical path 19 between adjacent sections of the condenser system 17. As in the case of the embodiment of FIG. 1, however, the exposure control disc is disposed in a plane of the optical system such that the mask acts as an aperture stop for the system. Thus, the exit pupil of the apparatus can be selectively restricted by rotation of the disc in a similar manner to that described above with reference to FIG. 1.

We claim:

1. In photodrafting equipment, projection apparatus comprising light projecting means; intensity varying means comprising a circular aperture-stop mask interposed in the optical path of said light projecting means to restrict the area of the exit pupil thereof and movable rotatably in use of the apparatus to vary the intensity of the light beam projected by said light projecting means; said mask being formed with a pair of diametrically opposed apertures, a pair of slots extending circumferentially in opposite rotational directions respectively of said mask from one of said apertures toward the other of said apertures, each of said slots being tapered along its length from a maximum width adjacent said one of said apertures to a minimum width at the other end of said slot, the said other ends of said slots being spaced from the other of said apertures by a pair of opaque regions which are interposed respectively between the minimum width ends of said slots and said other apertures; and means operable to move said mask rotatably through successive positions to progressively reduce the intensity of said light beam followed by relatively high intensity of said light beam that in turn is followed by substantially zero intensity of said light beam.

2. Photodrafting equipment of the type comprising means for mounting a sheet having a photosensitive surface, a carriage movable in orthogonal coordinate directions parallel to said sheet, means for controlling the movement of said carriage, the carriage including means for projecting a beam of light to provide a spot of light on said photosensitive surface, which spot exposes a line on said photosensitive surface as a result of movement of said carriage, and means interposed in the beam of light for selectively defining the size and shape of said spot of light; said carriage movement controlling means including means for controlling the intensity of said spot of light, said intensity controlling means being movable across said beam of light in a timed sequence between stations in which there is provided a constant intensity of said spot of light in a first station, a progressively increasing or decreasing intensity of said spot of light in a second station, and a predetermined intensity of said spot of light for a timed period followed by substantially zero intensity of said spot of light in a third station; said intensity controlling means being operable to provide a constant intensity of said spot of light as said carriage moves at a constant rate and a progressively increasing or decreasing intensity of said spot of light as said carriage accelerates or decelerates from or to a halt condition, and said intensity controlling means being further operable to hold on said spot of light for a predetermined period of time in said halt condition of said carriage after which said intensity controlling means provides substantially zero intensity of said spot of light.

3. Photodrafting equipment of the type comprising means for mounting a sheet having a photosensitive surface, a carriage movable in orthogonal coordinate directions parallel to said sheet, means for controlling the movement of said carriage, the carriage including means for projecting a beam of light to provide a spot of light on said photosensitive surface, which spot exposes a line on said photosensitive surface as a result of movement of said carriage, and means interposed in the beam of light for selectively defining the size of said spot of light; said carriage movement controlling means including means for controlling the intensity of said spot of light, said intensity controlling means comprising an aperture-stop mask interposed in the optical path of said light projecting means to restrict the area of the exit pupil thereof, said mask being formed with a slot which is tapered along its length from a maximum width at one end to zero width at the other end, an aperture following said other end of said slot, and an opaque region following said aperture; said intensity controlling means being movable in a timed sequence between stations in which there is provided a constant intensity of said spot of light in a first station, a progressively increasing or decreasing intensity of said spot of light in a second station, and a predetermined intensity of said spot of light for a timed period followed by substantially zero intensity of said spot of light in a third station; said intensity controlling means being operable to provide a constant intensity of said spot of light as said carriage moves at a constant rate and a progressively increasing or decreasing intensity of said spot of light as said carriage accelerates or decelerates from or to a halt condition, said spot of light being held on for a predetermined period of time in said halt condition after which said intensity controlling means provides substantially zero intensity of said spot of light.

4. Equipment as claimed in claim 3 wherein said intensity controlling means is circular, said slot extends circumferentially about said intensity controlling means, said intensity controlling means being movable rotatably to vary the intensity of the light beam projected by said light.

5. Equipment as claimed in claim 4 wherein said mask comprises the said tapered slot and a further tapered slot extending in opposite rotational directions circumferentially away from a further aperture located diametrically opposite the said aperture and each reducing in width in the respective directions in which those slots extend away from said further aperture, the said opaque region and a further opaque region being interposed between the said aperture and the narrower respective ends of the said slot and said further slot.

* * * * *